United States Patent [15] 3,665,585
Dunn et al. [45] May 30, 1972

[54] COMPOSITE HEAVY-DUTY MECHANISM ELEMENT AND METHOD OF MAKING THE SAME

[72] Inventors: William M. Dunn, Farmington; Myron C. Sarnes, Northville, both of Mich.

[73] Assignee: Federal-Mogul Corporation, Southfield, Mich.

[22] Filed: Dec. 4, 1970

[21] Appl. No.: 95,299

[52] U.S. Cl. ....................29/420
[51] Int. Cl. ....................B22f 3/12
[58] Field of Search ....................29/420, 420.5

[56] References Cited

UNITED STATES PATENTS

| | | | |
|---|---|---|---|
| 3,146,099 | 8/1964 | Teja | 29/420 X |
| 3,611,546 | 10/1971 | Haller | 29/420 |

*Primary Examiner*—Leonard H. Gerin
*Attorney*—Barthel & Bugbee

[57] ABSTRACT

A composite mechanism element, such as a bevel pinion (FIGS. 1 to 6 inclusive), or the inner race of a tapered roller bearing (FIGS. 7 to 10 inclusive and 16) has its working or load-bearing portion or portions composed of sintered powdered high-performance alloy while its supporting portion not subjected to concentrated or heavy loads, is made of a base metal, such as sintered powdered iron. The toothed outer load-bearing portion of the composite bevel pinion (FIG. 6) and the hollow frusto-conical inner supporting portion (FIGS. 10 to 15) are separately briquetted from high performance alloy powder and low performance metal powder respectively and separately sintered after which the low performance inner supporting portion is pressed into the high performance toothed outer portion so as to be inseparably secured thereto. In the inner race (FIG. 15) of the composite tapered roller bearing (FIG. 16) the low-performance and high-performance portions of the inner race are separately compacted in dies in a briquetting press to form briquettes which are separately sintered and thereafter are pressed together in an assembling operation which causes the high performance and low performance portions of each race to be inseparably secured to one another. The composite outer race is formed by arranging base metal powder and high performance alloy powder in abutting zones in an annular cavity of a briquetting press die and compressing them to form a composite briquette which is then sintered and afterward deformed in a forging die into its final annular shape. The resulting composite sintered powdered mechanism elements are of much lower material cost than corresponding mechanism elements formed of high performance alloy throughout yet perform satisfactorily and have sufficient strength and durability for most purposes. The tapered roller bearing races (FIG. 9) or the bevel pinion (FIG. 15) may be used as they are if of satisfactory density for their intended uses, or they may be further densified by being subjected to an additional hot forging operation with the article sintered thereafter if deemed necessary.

6 Claims, 16 Drawing Figures

24 20 22 96
94

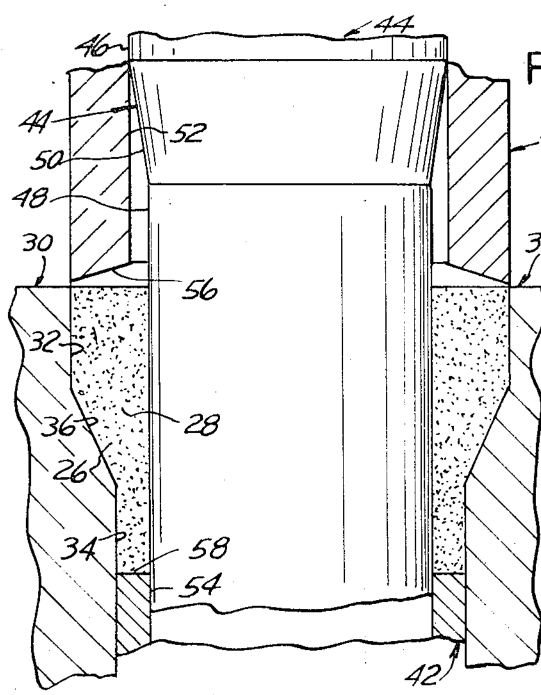
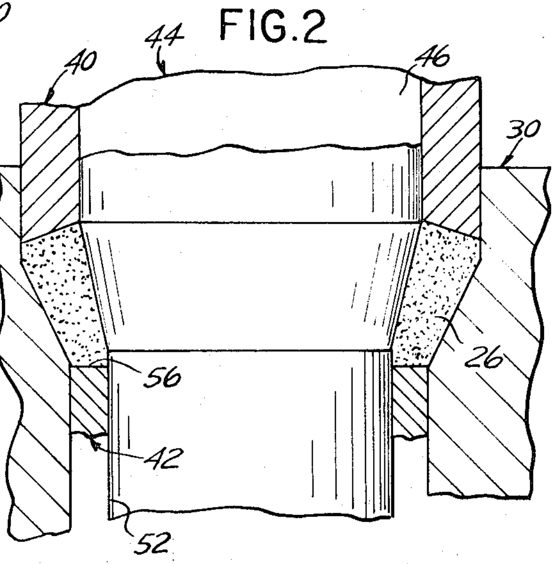
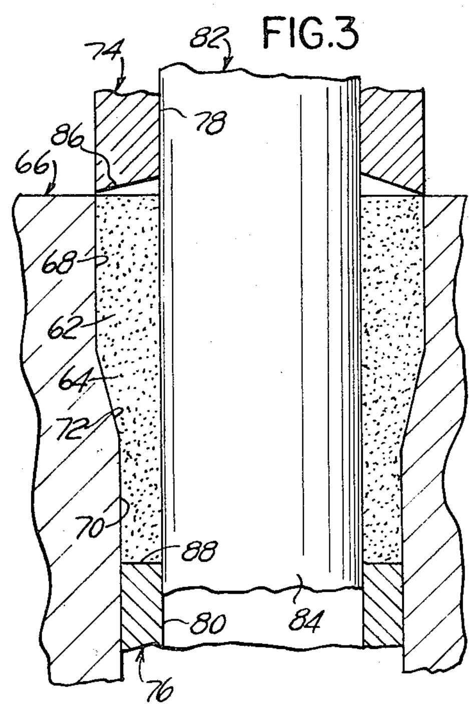
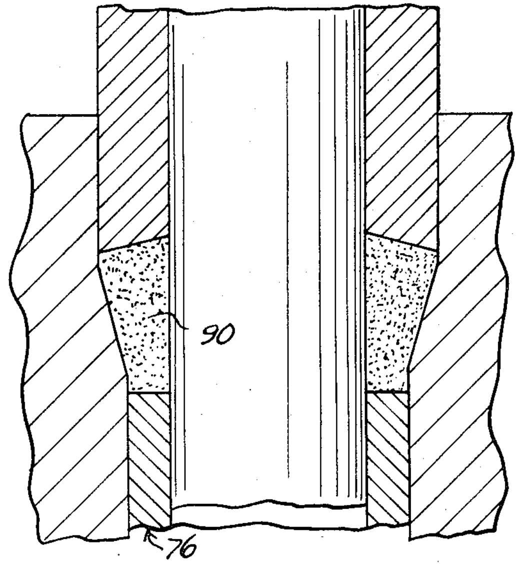
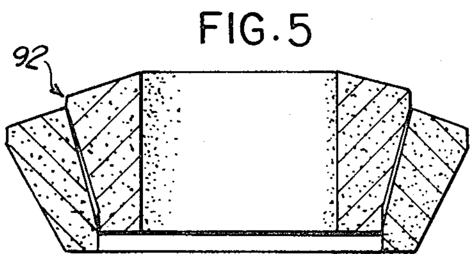
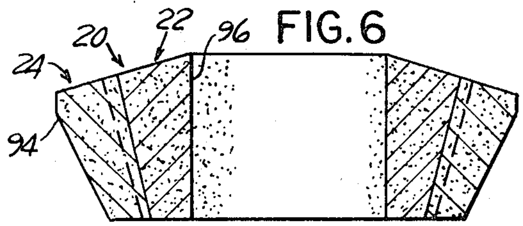
INVENTORS
WILLIAM M. DUNN
MYRON C. SARNES
BY Barthel & Bugbee
ATTORNEYS

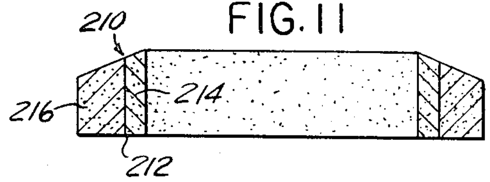
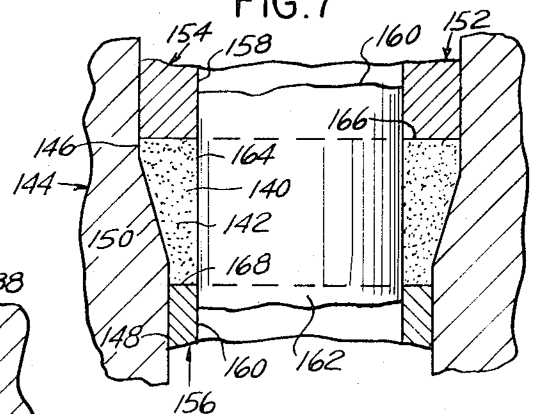
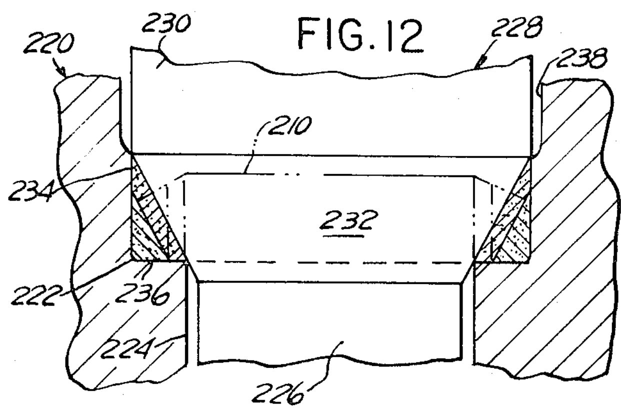
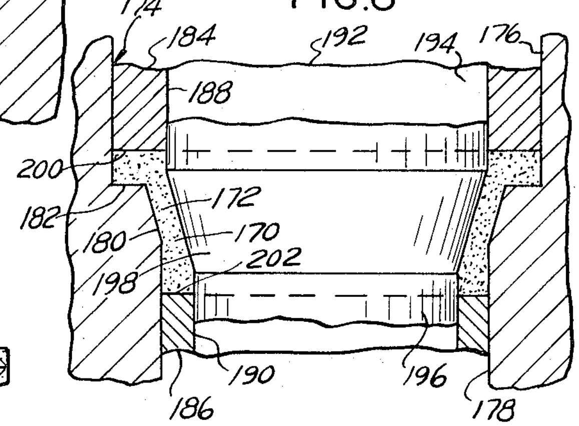
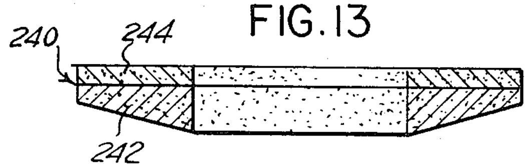
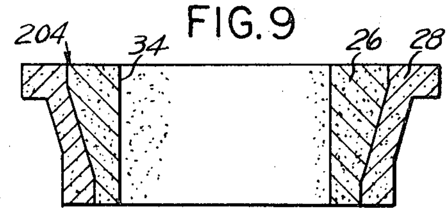
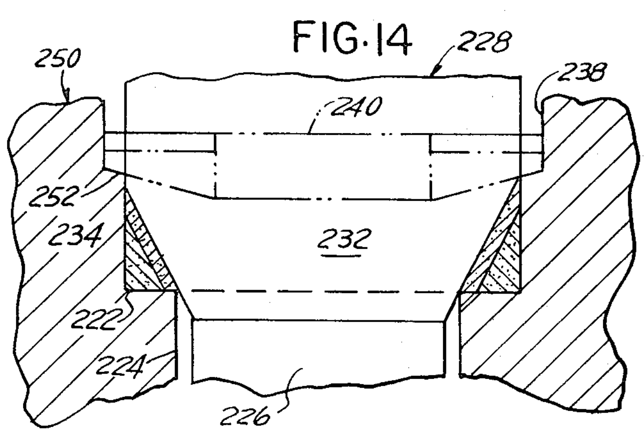
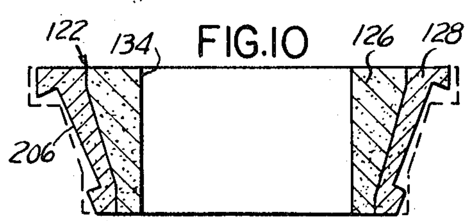
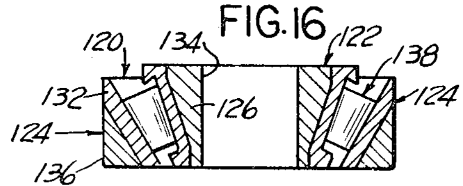
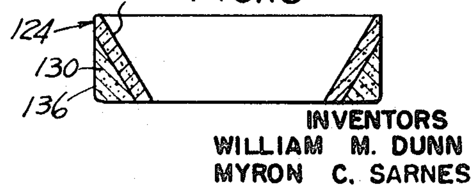
INVENTORS
WILLIAM M. DUNN
MYRON C. SARNES

COMPOSITE HEAVY-DUTY MECHANISM ELEMENT AND METHOD OF MAKING THE SAME

BACKGROUND AND SUMMARY OF INVENTION

Heavy-duty mechanism elements which during operation are subjected to heavy loads or stresses have hitherto been formed from high-cost nickel-content alloys which in themselves are very expensive and which consequently cause such mechanism elements made therefrom to be likewise very expensive. In actual fact, however, only a portion of such mechanism elements is ordinarily subjected to concentrated heavy loads, torques or stresses which require the use of high performance alloys, yet the formation of the entire mechanism element therefrom has hitherto been required and has been of excessively high cost of production not only from the high cost of the alloys themselves but also from the expensive forging operations required in its production.

The present invention overcomes these prior disadvantages by providing heavy-duty mechanism elements, such as bevel pinions and the inner races of tapered roller bearings wherein the working portions subjected to heavy or concentrated loads, torques or other stresses are formed from sintered powdered high-performance alloys whereas the remaining supporting portions thereof are formed from separately briquetted sintered powdered low-performance metals. The two portions, thus separately produced, are then pressed tightly into inseparable engagement with one another. As a result, the amount of high-cost high-performance alloy in each such mechanism element is greatly reduced in comparison to the forging of the same mechanism element from solid high-performance alloys throughout with a corresponding reduction in the ultimate cost of the finished mechanism element as well as a conservation of the nickel and other expensive metals which go into such alloys as components thereof. At the same time, however, the heavy-duty load-bearing performance capability of the composite mechanism element is preserved without entailing the high cost previously accompanying the production of forged unitary high performance mechanism elements of high performance alloys throughout. In the drawings, FIG. 1 is a central vertical section through the die cavity of a briquetting press showing the positions of the various parts at the commencement of briquetting the outer heavy-duty or working component of the heavy-duty bevel pinion shown in FIG. 6;

FIG. 2 is a view similar to FIG. 1 but showing the positions of the various parts at the termination of the briquetting operation;

FIG. 3 is a central vertical section through the die cavity of a briquetting press showing the positions of the parts at the commencement of the briquetting operation of the inner or supporting or hub component of the bevel pinion shown in FIG. 6;

FIG. 4 is a view similar to FIG. 3 but showing the positions of the parts at the termination of the briquetting operation;

FIG. 5 is a central vertical section through the inner and outer components for the bevel pinion shown in FIG. 6, at the commencement of the assembling operation for uniting said outer and inner components;

FIG. 6 is a central vertical section through the composite heavy-duty bevel pinion formed in the manner shown in FIGS. 10 to 14 inclusive, with the dotted lines indicating the roots of the teeth thereon;

FIG. 7 is a central vertical section through the die cavity of a briquetting press, showing the formation of the inner component of the composite heavy-duty inner race of FIG. 10, used in the heavy-duty tapered roller bearing unit shown in FIG. 16;

FIG. 8 is a central vertical section through the die cavity of a briquetting press, showing the formation of the outer heavy-duty component of the composite heavy-duty inner race for the tapered roller bearing unit of FIG. 16;

FIG. 9 is a central vertical section through the composite heavy-duty inner race of FIG. 10, employing the inner and outer components of FIGS. 7 and 8, prior to the machining of the annular roller path channel therein;

FIG. 10 is a view similar to FIG. 9 with the inner race before machining shown in dotted lines and after such machining shown in solid lines;

FIG. 11 is a central vertical section through a composite sintered powdered metal blank of high-performance alloy powder inside and low-performance metal powder outside prior to deformation into the outer race of a heavy-duty tapered roller bearing unit;

FIG. 12 is a central vertical section through the die cavity of a press showing in dotted lines the blank of FIG. 11 and in solid lines the same blank after deformation into a composite heavy-duty outer race for the tapered roller bearing unit shown in FIG. 16;

FIG. 13 is a central vertical section through a modified composite sintered powdered metal blank of high-performance alloy powder above and low-performance metal powder below, prior to deformation into the same outer race for the same heavy-duty tapered roller bearing unit shown in FIG. 16;

FIG. 14 is a central vertical section through the die cavity of a press similar to that shown in FIG. 12, but showing in dotted lines the blank of FIG. 13 and in solid lines the same blank after deformation into the same composite heavy-duty outer race for the same tapered roller bearing unit shown in FIG. 16;

FIG. 15 is a central vertical section through the composite outer race formed as shown in FIGS. 11 and 12 or as in FIGS. 13 and 14; and FIG. 16 is a central vertical section through a tapered roller bearing unit employing the composite heavy-duty inner and outer races formed in the manner shown in FIGS. 7 to 15 inclusive.

Referring to the drawings in detail, FIGS. 1 to 6 inclusive show the adaptation of the present invention to the production of a composite heavy-duty bevel pinion, generally designated 20 (FIG. 6) consisting of an inner component 22 of low-performance sintered powdered metal, such as sintered powdered iron, and a toothed outer component 24 of high-performance sintered powdered metal alloy united thereto by pressure forging, as shown in FIG. 5. The outer or toothed component 24 is formed by compressing a charge 26 (FIGS. 1 and 2) of a high-performance powdered metal alloy in the generally frusto-conical die cavity 28 of a briquetting die 30 having cylindrical upper and lower bores 32 and 34 respectively joined by a frusto-conical bore 36.

Such a high-performance alloy may consist, for example, of the so-called "S.A.E. 4600" modified alloy, the standard composition of which is ordinarily as follows:

| | | |
|---|---|---|
| 0 to 0.25% | Mn. | the remainder being Fe. |
| 1.75 to 2.00% | Ni. | |
| 0.35 to 0.60% | Mo. | |

The standard "S.A.E. 4600" alloy of which the above is a modification has the following composition:

| | | |
|---|---|---|
| 0.45 to 0.65% | Mn. | the remainder being Fe. |
| 1.65 to 2.00% | Ni. | |
| 0.20 to 0.30% | Mo. | |
| 0.20 to 0.35% | Si. | |

The silicon component is omitted in the modified alloy because silicon is detrimental to the working life of a die set. It is ordinarily inserted in the above standard alloy in order to increase the fluidity of the molten alloy during the casting of intricate shapes.

The die 30 is mounted in a conventional briquetting press 38 having an upper outer tubular punch 40, a lower tubular punch 42, and an upper inner solid punch 44. The latter has upper and lower cylindrical portions 46 and 48 respectively interconnected by a frusto-conical portion 50 and reciprocable in upper and lower inner bores 52 and 54 within the tubular punches 40 and 42. The smaller diameter cylindrical portion 48 serves as a nose portion when the inner upper punch 44 is raised together with the outer punch 40 so as to permit filling of the die cavity 28 and at the same time prevent the powdered metal alloy in the charge 28 from dropping into the otherwise open bore 54 within the lower tubular punch 42.

Prior to filling the die cavity 26 (FIG. 1) the outer upper tubular punch 40 is retracted upward so as to uncover the top of the die cavity 26. The latter is then filled with the charge 28 of high-performance powdered metal alloy. The outer and inner upper punches 40 and 44 are then moved downward in their respective bores 32 and 52, 54 from the position of FIG. 1 to that of FIG. 2 while the lower tubular punch 42 is moved upward in its respective bore 34 so as to compress the powdered metal alloy charge 28 between the respective opposing annular end surfaces 56 and 58 (FIG. 2) into a briquette 60, of the same dimensions and proportions as the die cavity 26 and charge 28 at the end of the stroke of the punches 40, 42 and 44 as shown in FIG. 2. The briquette 60 is then placed in a conventional sintering oven and sintered in a protective atmosphere such as hydrogen at conventional sintering times and temperatures well-known to those skilled in the powder metallurgy art. The workpiece, upon removal from the sintering oven after sintering, becomes the outer or toothed heavy-duty component 22 of the bevel pinion 20 shown in FIG. 6.

The inner component 22 of the bevel pinion 20 is similarly formed (FIGS. 5 and 6) by placing a charge 62 of low-performance powdered base metal, such as powdered iron, in the generally frusto-conical die cavity 64 in a briquetting die 66 which is generally similar to the briquetting die 30 of FIGS. 1 and 2 in that it has cylindrical upper and lower bores 68 and 70 respectively joined by a frusto-conical bore 72. Reciprocably mounted in the upper and lower cylindrical bores 68 and 70 are upper and lower tubular punches 74 and 76. Mounted within the bores 78 and 80 in the upper and lower tubular punches 74 and 76 is a cylindrical core rod 82, the outer cylindrical surface 84 of which, along with the upper and lower cylindrical bores 68 and 70 and the frusto-conical bore 72 constitute the die cavity 64.

In making the inner component 22, the upper punch 74 is retracted upward so as to uncover the die cavity 64. The latter is then filled with the charge 62 of low-performance powdered metal, such as powdered iron, whereupon the upper punch 74 is moved downward and the lower punch 86 is moved upward so as to compress the powdered metal charge 62 between their respective opposing annular end surfaces 86 and 88 respectively into a briquette 90 (FIG. 4). The tubular upper punch 74 and lower punch 76 are then moved upward to eject the briquette or compact 90 from the die cavity 64. The briquette or compact 90 is then sintered in the same manner as described above for the outer component 24, thereby becoming the inner component 22. The inner component 22 of base metal is then forced into the interior of the sintered high-performance alloy outer component 24 in a forging operation (FIG. 5), producing the composite blank 92. The latter is then cut or ground with bevel teeth 94, whereupon the blank 92 becomes the finished bevel pinion 20 containing an inner bore 96 which is adapted to receive the shaft (not shown) upon which the bevel pinion 20 is to be mounted.

In FIGS. 7 to 16 inclusive there is shown the adaptation of the present invention to the production of a heavy-duty tapered roller bearing unit, generally designated 120 (FIG. 16) having a composite sintered powdered metal inner race or cone 122 (FIG. 10) and a composite sintered powdered metal outer race or cup 124 (FIG. 15). The inner race or cone 122 (FIG. 10) has an inner component 126 of sintered low-performance powdered base metal, such as powdered iron, united by pressure forging with a sintered high-performance powdered alloy outer component 128. The outer race or cup 124 (FIG. 9) has an outer component 130 of sintered low-performance powdered base metal, such as powdered iron, and an inner component 132 of sintered high-performance powdered alloy. The inner component 126 of the composite inner race 122 has a shaft bore 134 therein for receiving the shaft (not shown) to be journaled in the tapered roller bearing unit 120, whereas the outer component 130 of the outer race 124 has a generally cylindrical outer surface 136 adapted to be mounted in a cylindrical bore or counterbore in the housing or other structure (not shown) in which the bearing unit 120 is to be mounted. Tapered bearing rollers 138 (FIG. 10) are mounted in the space between the outer and inner races 124 and 122.

The inner component 126 of the inner race 122 is formed by placing a charge (FIG. 1) of low-performance powdered base metal, such as powdered iron, adapted, upon compression, to form a compact or briquette 140 in the generally frusto-conical die cavity 142 of a briquetting die 144 having cylindrical upper and lower bores 146 and 148 respectively joined by a frusto-conical bore 150. The die 144 is mounted in a conventional briquetting press 152 having upper and lower tubular punches 154 and 156 respectively reciprocably mounted in the die bores 146 and 148 and operatively connected to reciprocable upper and lower platens (not shown) in the briquetting press 152. Fixedly mounted in the bores 158 and 160 in the upper and lower tubular punches 154 and 156 is a stationary core rod 162, the cylindrical outer surface 164 of which, with the bores 146, 150 and 148, the lower end 166 of the upper punch 154 and the upper end 168 of the lower punch 156, defines the die cavity 142. The charge of powdered base metal is then compacted into the briquette 140 by moving the upper punch 154 downward and the lower punch 156 upward to their final or end-of-stroke positions shown in FIG. 1, compressing the powdered base metal charge into the briquette 140 of the same dimensions and proportions as the die cavity 142 at the end of the strokes of the upper and lower punches 54 and 56. The briquette 140 thus obtained is then placed in a conventional sintering oven and sintered in a protective atmosphere such as hydrogen at conventional sintering times and temperatures well known to those skilled in the powder metallurgy art. The workpiece upon removal from the sintering oven after sintering is the inner component 126 of the inner race or cone 122 shown in FIG. 3.

The outer component 128 of the inner race 122 is similarly formed (FIG. 2) by placing a charge of high-performance powdered alloy metal suitable for forming the desired compact or briquette 170, such as has been described more fully above, in the generally frusto-conical die cavity 172 in a briquetting die 174, generally similar to the briquetting die 152 of FIG. 1 and having cylindrical upper and lower bores 176 and 178 respectively joined by a frusto-conical bore 180 and an annular shoulder 182 connecting the latter to the cylindrical bore 176. Reciprocably mounted in the upper and lower cylindrical bores 176 and 178 are an outer upper tubular punch 184 and a lower tubular punch 186. Reciprocably mounted within the upper and lower bores 188 and 190 of the outer upper punch 184 and lower punch 186 respectively is an inner upper punch 192 (FIG. 2) having upper and lower cylindrical portions 194 and 196) interconnected by a frusto-conical portion 198. The smaller diameter cylindrical portion 196 serves as a nose portion when the inner upper punch 192 is raised together with the outer punch 184 so as to permit filling of the die cavity 172 without permitting the powder in the charge placed therein to drop into the otherwise open bore 190 within the lower tubular punch 186.

In making the outer component 26, the outer upper tubular punch 84 is retracted upward so as to uncover the die cavity 172. The die cavity 172 is then filled with the charge of high-performance alloy powder, whereupon the outer upper punch 184 is moved downward and the lower tubular punch 186 is moved upward so as to compress the powdered alloy charge between their respective opposing annular end surfaces 200 and 202 to form the compact or briquette 170. The tubular outer upper punch 184 is then retracted upward, together with the inner upper punch 192 and the lower tubular punch 186 is at the same time moved upward to eject the thus-formed compact 170 from the die cavity 172. This compact 170 is then sintered in the same manner as described above for that of the inner component 126, thereby becoming the outer component 128. The sintered inner component 126 of base metal is then forced into the interior of the sintered high-performance alloy outer component 128 in a forging operation. The resulting composite blank, generally designated 204, is then ground externally from the contour shown in dotted lines in FIG. 4 to the contour shown in solid lines therein so as to produce the annular roller path groove 206, whereupon the blank 204 becomes the finished inner race or cone 122.

In FIGS. 11 to 14 inclusive there is shown the formation of the composite outer race 124 for the heavy-duty tapered roller bearing unit 120 shown in FIG. 16. The method of making the outer race or cup 124 is disclosed and claimed in our co-pending application, Ser. No. 95,310 filed Dec. 4, 1970 for Composite Heavy-Duty Machine Element and Method of Making the Same. It is briefly described here for the sake of completeness and by reason of the fact that an outer race or cup is essential to a tapered roller bearing unit.

The outer component 124 is formed in either of two ways, the first being shown in FIGS. 11 and 12 and the second in FIGS. 13 and 14. In FIGS. 11 and 12, a composite sintered powdered metal blank 210 is made by placing a tubular divider (not shown) in the annular die cavity of a conventional briquetting press between its core rod and its outer wall at the place where the junction 212 between the high-performance sintered metal alloy inner component 214 and the low performance sintered powdered metal outer component 216 is to be located. The operator now fills the inner zone of the die cavity with high-performance powdered metal alloy of the type described above, then fills the outer zone with low-performance powdered metal, such as powdered iron, and then withdraws the tubular divider. He then operates the briquetting press to compress the two powders so that they form a compact or briquette. The latter is then placed in a sintering oven and sintered, whereupon it becomes the blank 210 with the high performance sintered powdered metal alloy inner component 214 and the low performance sintered powdered metal outer component 216 firmly and inseparably bonded to one another.

The composite sintered powdered metal blank 210 thus produced is then preferably heated to a warm temperature between 800° F. and 1,375° F. or to a hot temperature of 1,375° F. to 2,300° F. and forged into its final shape 124 in a forging press 220 having an annular die cavity 222. The die cavity 22 forms the counterbore of a bore 224 into which the reduced diameter nose portion 226 of a forging punch 228 extends. The forging punch punch 228 includes an upper large diameter portion 230 and a frusto-conical portion 232 extending between the large diameter portion 230 and the small diameter portion 226. The large diameter portion 230 is movable into and out of the cylindrical bore portion 234 of the die cavity 222, which has an annular shoulder 236 extending from the small diameter bore 224 to the larger diameter bore 234 which in turn opens into a slightly larger diameter counterbore 238.

With the forging punch 228 in its raised or retracted position, the thus-heated composite sintered powdered metal blank 210 is dropped into the die cavity 222 of the forging press 220. The forging punch 228 is then brought downward upon the heated blank 210, such as by moving downward the platen (not shown) to which the forging punch 228 is attached, thereby deforming the blank 210, shown in dotted lines in FIG. 12, into the final shape of approximately triangular cross-section shown in solid lines in FIGS. 12 and 16, thereby producing the composite outer race or cup 124. The latter is the ejected from the die cavity 222.

In FIGS. 13 and 14 is shown an alternate method of producing the composite sintered powdered metal outer race or cup 124 from an annular blank 240 shown in FIG. 13. The annular blank 240 is also produced in the die cavity of a conventional briquetting press (not shown), and consists of an annular lower sintered powdered metal portion 242 of low performance metal, such as powdered iron, and above it an annular upper sintered powdered metal portion 244 of high-performance metal alloy, such as described above firmly and inseparably bonded to one another. The method of producing the blank 240 is generally similar to that described above in connection with the blank 210 of FIGS. 11 and 12, except that the tubular separator is not used. Instead, the operator places in the annular die cavity a charge of low performance powdered base metal, such as powdered iron, and afterward superimposed upon it a layer of high-performance powdered metal alloy, whereupon the briquetting press compresses the thus-superimposed powders into a compact or briquette which, after sintering in a conventional sintering press, preferably in a protective atmosphere, such as hydrogen, becomes the composite blank 240.

The composite blank 240 is now heated to either of the temperature ranges mentioned above in connection with the blank 210 and then forged into its final shape 124 in the forging press 250. The latter is similar in construction and operation to the forging press 220, hence similar parts are designated with the same reference numerals, except that an inclined annular shoulder 252 extends from the upper counterbore 238 to the cylindrical portion 234 of the lower counterbore 222. With the forging punch 228 in its raised or retracted position, the thus-heated sintered powdered metal blank 240 is dropped into the die cavity 222 of the forging press 220, whereupon the forging punch 228 is moved downward into the die cavity 222, thereby deforming the blank 240 from the dotted line position shown in FIG. 14 to the solid line position shown in FIG. 16, thereby producing the composite outer race or cup 124. The latter is then ejected from the die cavity 222.

I claim:

1. A method of making a composite heavy-duty mechanism element, comprising
   - confining an annular mass of low-performance metal particles in an annular enclosure,
   - confining an annular mass of high-performance powdered alloy particles in an annular enclosure having a side wall surface configured to impart to said high performance mass a surface adapted to mate with a surface of said low-performance mass,
   - compacting each mass separately in its respective annular enclosure,
   - sintering each such compacted mass,
   - and pressing said masses into particle-interlocking mating engagement subsequent to said sintering.

2. A method, according to claim 1, wherein the high-performance alloy particle mass is disposed externally of the low-performance metal particle mass during said pressing step.

3. A method, according to claim 1, including forming teeth in the high-performance alloy particle mass.

4. A method, according to claim 1, including forming an annular roller path on the high-performance alloy particle mass.

5. A method, according to claim 3, including inclining said teeth relatively to the axis of said mass during formation of said teeth.

6. A method, according to claim 4, including recessing said roller path into said high-performance alloy particle mass during formation of said roller path into said high-performance alloy particle mass during formation of said roller path.

* * * * *